United States Patent
Musacchia

[11] Patent Number: 5,988,469
[45] Date of Patent: *Nov. 23, 1999

[54] GAME CALL HOLDER

[75] Inventor: John Musacchia, Marathon, Fla.

[73] Assignee: Muzzy Products Corporation, Cartersville, Ga.

[*] Notice: This patent is subject to a terminal disclaimer.

[21] Appl. No.: 08/654,229

[22] Filed: May 28, 1996

Related U.S. Application Data

[63] Continuation-in-part of application No. 08/498,434, Jul. 5, 1995, Pat. No. 5,607,091.

[51] Int. Cl.⁶ .................................................. A45F 5/00
[52] U.S. Cl. ........................ 224/267; 224/222; 224/246; 108/43
[58] Field of Search ..................... 224/101, 191, 224/218, 219, 222, 224, 225, 250, 251, 267, 244, 245, 246, 277, 534, 324, 568; 108/43; 446/26, 28, 397, 404

[56] References Cited

U.S. PATENT DOCUMENTS

| | | |
|---|---|---|
| 1,786,254 | 12/1930 | Meehan . |
| 2,338,816 | 1/1944 | Lockhart . |
| 2,420,673 | 5/1947 | Monrad . |
| 2,701,173 | 2/1955 | Senior et al. . |
| 3,407,757 | 10/1968 | Warner . |
| 4,243,249 | 1/1981 | Goss . |
| 4,422,640 | 12/1983 | Tamarkin . |
| 4,494,754 | 1/1985 | Wagner, Jr. . |
| 4,494,755 | 1/1985 | Caillouet, Jr. . |
| 4,606,733 | 8/1986 | Willis . |
| 4,648,603 | 3/1987 | Hayford, Jr. . |
| 4,955,845 | 9/1990 | Piper . |
| 5,035,390 | 7/1991 | Sanders . |
| 5,069,375 | 12/1991 | Flick . |
| 5,111,981 | 5/1992 | Allen . |
| 5,178,575 | 1/1993 | Koch . |
| 5,244,430 | 9/1993 | Legursky . |
| 5,263,423 | 11/1993 | Anderson . |
| 5,450,993 | 9/1995 | Guerrero et al. . |

FOREIGN PATENT DOCUMENTS 103154   1/1917   United Kingdom .

Primary Examiner—Allan N. Shoap
Assistant Examiner—Gregory M. Vidovich
Attorney, Agent, or Firm—Deveau, Colton & Marquis

[57] ABSTRACT

A holder for retaining an item, particularly a turkey call, other game call, clipboard, pad or the like on the limb of a user while leaving his or her hands free. The holder includes a base having a hollow center. Rubber feet are arranged about the hollow center to support the item. The item is held against the rubber feet by an elastic band. A nylon web strap, provided with a snap buckle, is used to secure the holder to the user's limb. A belt attached tether may be provided to assist in retaining the holder on a limb (e.g., the thigh) of the user.

12 Claims, 4 Drawing Sheets

GAME CALL HOLDER

CROSS-REFERENCE TO RELATED APPLICATION

This application is a continuation-in-part of application Ser. No. 08/498,434, filed Jul. 5, 1995 which has matured into U.S. Pat. No. 5,607,091.

BACKGROUND OF THE INVENTION

1. Field of the Invention

The present invention relates to a game call holder for a turkey call, for example, by which a turkey call or other items (e.g., a pilot's clipboard) can be strapped onto a limb of a user.

2. Description of the Prior Art

Various hand-operated devices that imitate mating calls and other sounds made by turkeys have been used by hunters to attract turkeys. Hunters have had to put down the turkey call before shooting, so as to be able to hold their gun with both hands. The interruption of the calling sound and the hunter's movement in putting down the turkey call tends to startle the turkeys, allowing them to escape into cover or out of the gun's range before a shot can be taken.

U.S. Pat. No. 4,606,733, issued to Alvin D. Willis, on Aug. 19, 1986, discloses a slate box turkey call, that is useful for illustrating the state of the art of turkey calls, but does not have a means for attaching the call to the body of the hunter.

U.S. Pat. No. 4,955,845, issued to Frank R. Piper, on Sep. 11, 1990, discloses a game calling device, with a flexible pouch in which to enclose the device when it is not being used.

U.S. Pat. No. 5,035,390, issued to Joseph Sanders, on Jul. 30, 1991, discloses an adapter for attaching an animal call to a firearm, rather than the body of the hunter.

U.S. Pat. No. 5,111,981, issued to Melvin L. Allen, on May 12, 1992, discloses a game call holder, for holding a game call on the user's chest or shoulder. The game call holder of Allen does not provide for the acoustic isolation of the call, unlike the game call holder of the present invention.

U.S. Pat. No. 5,178,575, issued to Clarence E. Koch, on Jan. 12, 1993, discloses a game call having glass and slate frictional striking surfaces, but no means for attaching it to a hunter's body.

U.S. Pat. No. 5,244,430, issued to Roy A. Legursky, on Sep. 14, 1993, discloses a turkey caller and support apparatus, which does not provide for the complete acoustic isolation of the turkey caller.

None of the above inventions and patents, taken either singly or in combination, is seen to describe the instant invention as claimed.

SUMMARY OF THE INVENTION

The game call holder of the present invention includes a base having a hollow center. Rubber feet are arranged about the hollow center to support and acoustically isolate a game call. The game call is held against the rubber feet by an elastic band. A nylon web strap, provided with a snap buckle, is used to secure the call holder to the user's thigh.

Accordingly, it is a principal object of the invention to provide a holder for a turkey or other game call, by which the call can be conveniently retained on the user's limb, thus permitting a hunter to operate the call by one hand and to move his hand from the call to his gun quickly and with a minimum of movement.

It is another object of the invention to provide for the complete acoustic isolation of the call, so that the sound of the call is not dampened by contact with the user's body or clothing or another surface.

It is a further object of the invention to provide a holder useful for holding a variety of turkey and other game calls, a clipboard, a notepad, etc.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
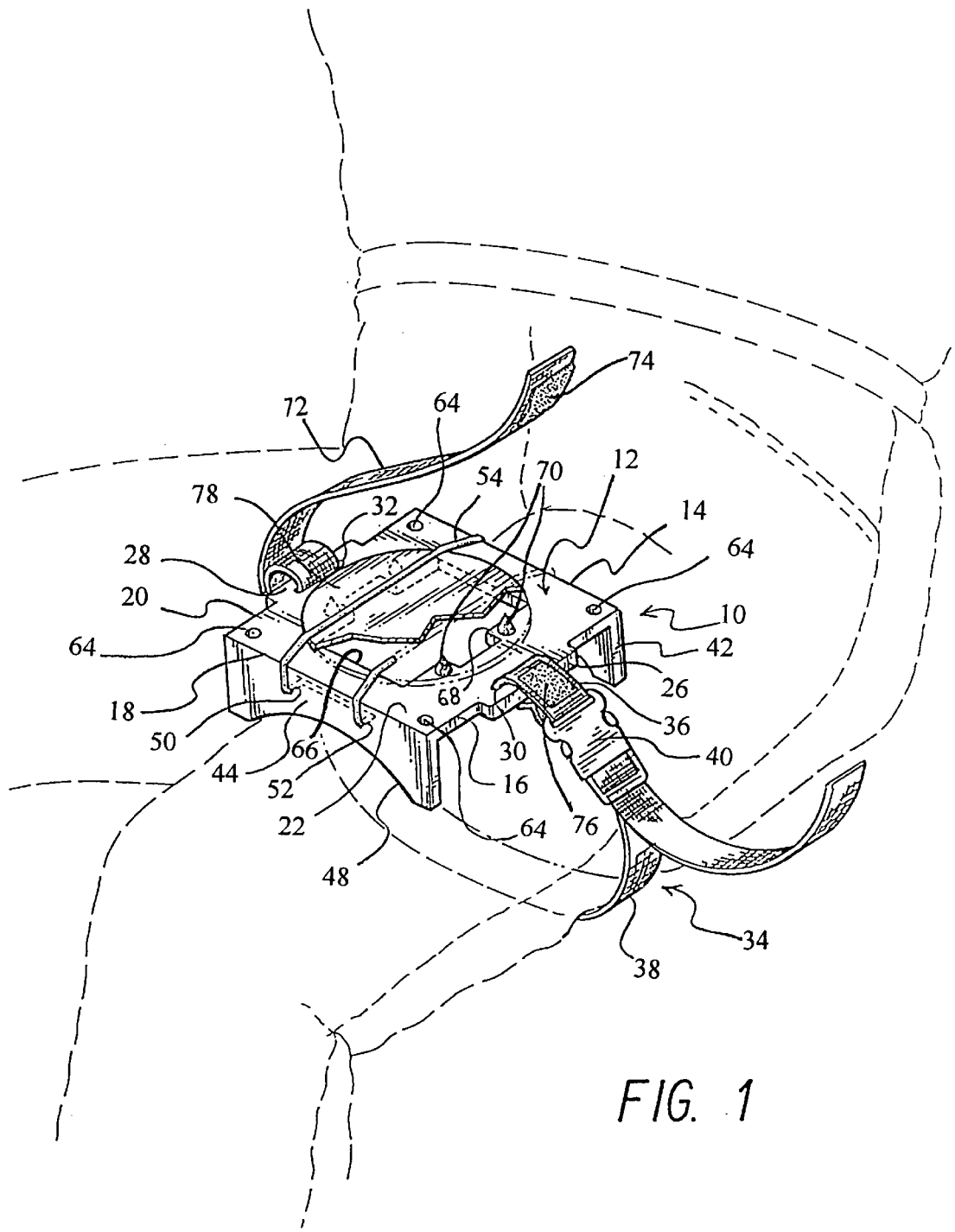
FIG. 1 is an environmental perspective view of the holder of the present invention being used to hold a slate call on a user's thigh with the user in a seated position.

Referring to FIGS. 1–4, the present invention is a call holder 10 which is capable of being attached to a user's limb such as his or her thigh. The holder 10 has a substantially square shaped base 12 having first, second, third, and fourth sides 14, 16, 18, and 20, respectively. The base 12 also has a top face 22 and a bottom face 24. Each of the second and fourth sides 16 and 20 has an extension, 26 and 28, projecting therefrom. The extensions 26 and 28 each have a slot, 30 and 32, formed therein. The slots 30 and 32 allow the strap 34 to be attached to the base 12.

The strap 34 has two pieces 36 and 38. Each piece 36 and 38 is attached to a respective one of the slots 30 and 32 by having an end of the piece looped through the respective slot and sewn back on to the piece itself. The free end of each of the pieces 36 and 38 has a portion of a snap buckle 40 attached thereto. The strap 34 is preferably made of a nylon web material, and the strap 34 is adjustable in length so that it can be secured around different size limbs. The position of the portion of the snap buckle 40 which is attached to the piece 38, is adjustable along the length of the piece 38 thus allowing the length of the strap 34 to be adjustable.

Projecting perpendicularly from the bottom face 24 are two flanges 42 and 44. The flanges 42 and 44 are attached to the base 12 along the length of sides 14 and 18 respectively. Flanges 42 and 44 have curved edges 46 and 48 which are shaped to follow the contour of a user's limb. Flange 44 has two holes 50 and 52 which are used to anchor the elastic band 54 whose function will be described later. Flange 42 has a pair of substantially rectangular cutouts 56 whose function will also be described later. The cutouts 56 are spaced apart so as to form a projection 57. Flange 42 also has a pair of holes 58 which allow the attachment of a tether 60. Tether 60 is threaded through a hook 62 which is designed to securely hook to the user's belt.

The base 12 has four holes 64 provided at each corner thereof to allow a pen or a striker (not shown) to be tethered thereto. Base 12 also has a cutout 66 centrally located therein. The central cutout 66 is substantially in the form of two overlapping rectangles arranged in a plus sign configuration in plan view. The shape of the central cutout 66 leaves four projections 68 which jut out into the central cutout 66. A rubber foot 70 is supported by each of the projections 68. The projections 68 and the rubber feet 70 are positioned such that the rubber feet lie at the vertices of a rectangle in plan view.

A strap 72 is sewed to piece 38 near the slot 32 at one ends and has a first portion 74 of a hook-and-loop fastener attached to the other end thereof. The second portion 76 of the hook-and-loop fastener is sewed to the piece 36 near slot 30. The strap 72 is intended to hold the call securely in place when the call is not in use.

Figure 2:
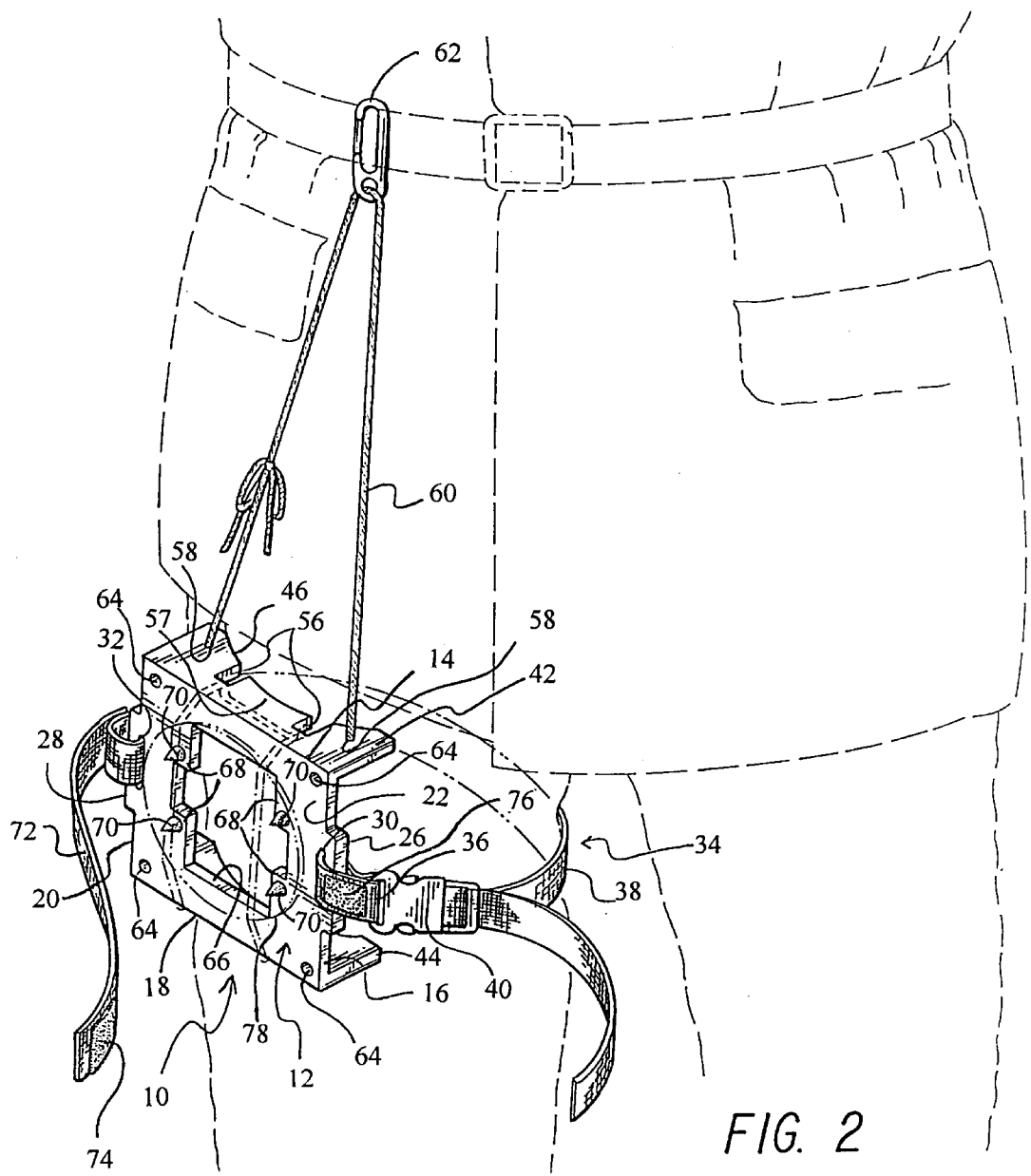
FIG. 2 is an environmental perspective view of the holder of the present invention strapped to a user's thigh with the user in a standing posture.
Figure 4:
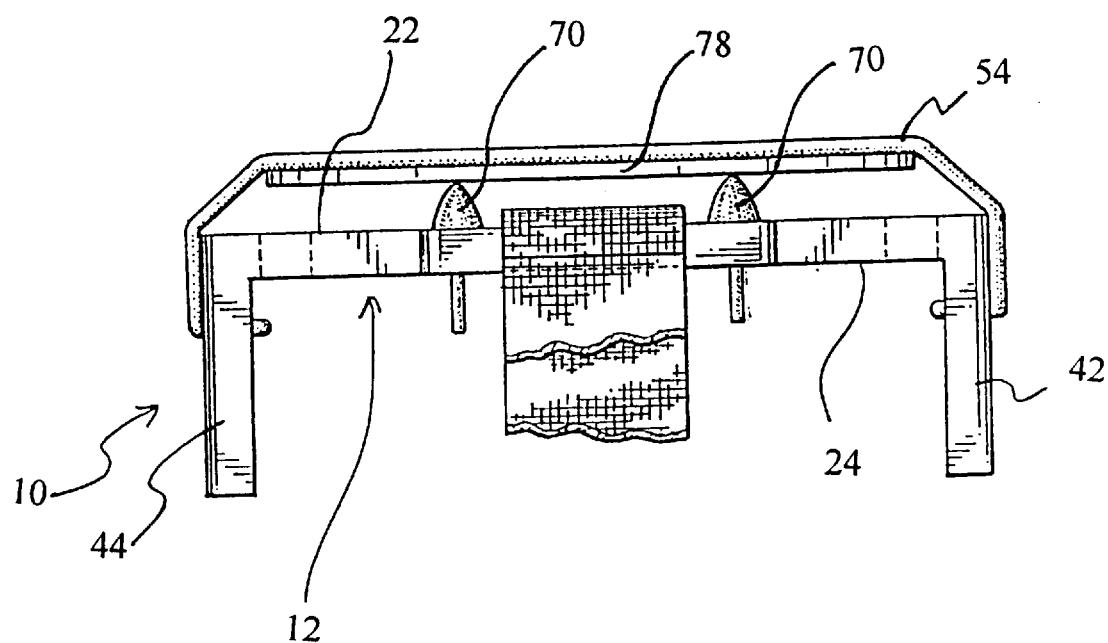
FIG. 4 is a side view of the holder of the present invention, showing the acoustic isolation of a slate call by the rubber feet and the elastic band of the holder.

In use the holder 10 is strapped to a user's leg at about the middle of the thigh using strap 34, as shown in FIGS. 1 and 2. FIGS. 1, 2, and 4 show the holder being used to hold a slate call 78 which is basically a flat circular piece of slate. The slate call 78 is rubbed or scraped with a striker to imitate sounds made by turkeys. Because the user is in a seated position when calling turkeys, the top face 22 of holder 10 will be horizontal during use. The striker is a well known item in the art and is therefore not shown herein. With the holder 10 strapped to the thigh, the slate call 78 is placed on the rubber feet 70. The elastic band 54 forms a loop which has one end fixed to the flange 44 by holes 50 and 52. The other end of the loop of the elastic band 54 is stretched over the slate 78 and looped around projection 57 such that the elastic band 54 passes through the cutouts 56. Because the elastic band 54 is under tension after being looped around the projection 57, the elastic band will tend to retain the slate 78 firmly against the rubber feet 70. Thus the slate 78 is entirely suspended by elastic material and is acoustically isolated. The acoustic isolation is an important factor in preserving the sound quality of the slate call, because contact between the slate 78 and the user's body, the user's clothing, or the base 12 will tend to deaden the sound produced by the slate. The central opening or cutout 66 also helps sound quality by providing an air space under the slate 78, thus allowing sounds produced by the slate to propagate through the air space below the slate unhindered by the base 12. The slate 78 can now be scraped with the striker to call turkeys.

It is important to note here that this invention is not limited specifically to the four rubber feet 70 shown, for providing acoustic isolation for the slate call 78 or other call mounted on the base 12. Thus, resilient blocks, tips, heads or other suitable acoustic isolation devices or structures could be used instead, in greater or fewer numbers than the four rubber feet 70 shown in the drawings.

When the user, most likely a hunter or perhaps a photographer, wishes to change location, he or she does not need to remove the holder 10 from his or her thigh. The user can simply attach hook 62 to his or her belt, stretch strap 72 over the slate 78 and secure the free end of the strap 72 using the hook-and-loop fastener portions 74 and 76, and then walk about in the normal manner. The strap 72 will prevent the slate 78 from sliding out of the holder 10, while the hook 62 and the tether 60 prevent the holder 10 from sliding down the user's thigh.

Figure 3:
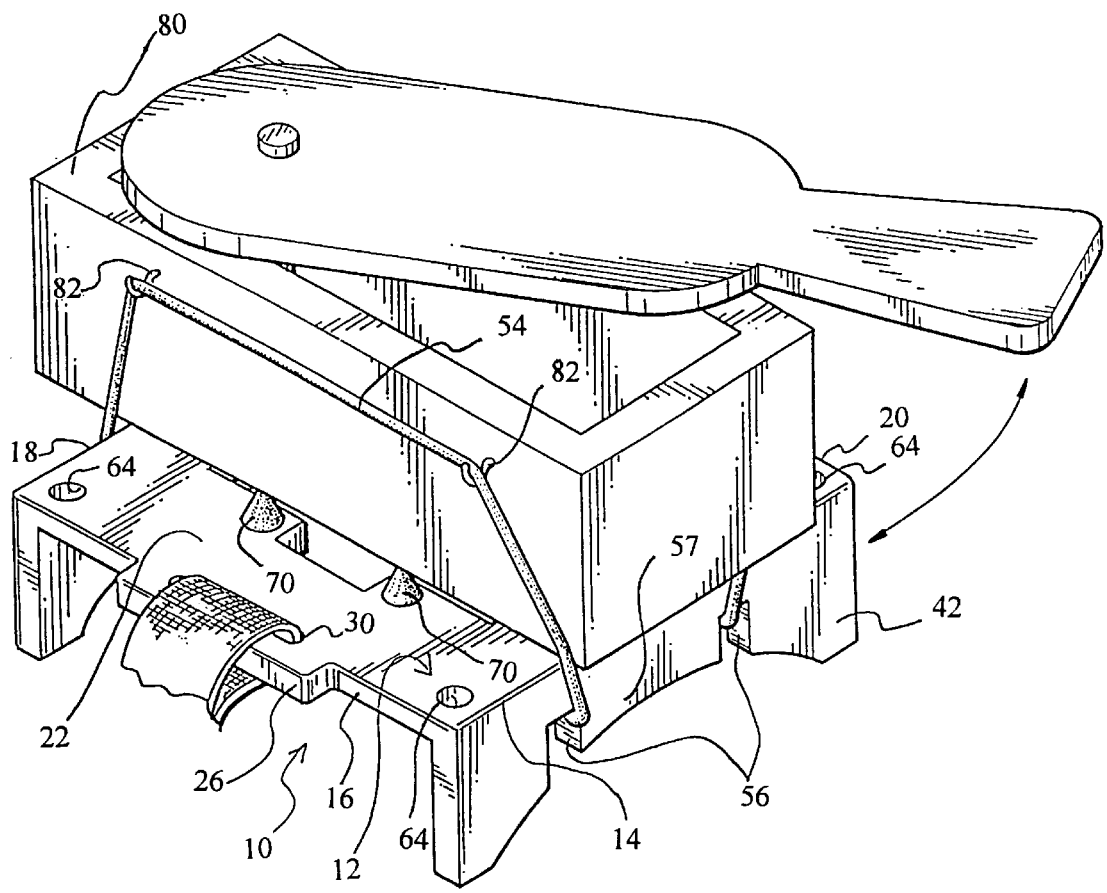
FIG. 3 is a perspective view of the holder of the present invention being used to hold a box call.

Referring to FIG. 3, the holder 10 is shown while being used with a box call 80. The box call 80 is modified by the addition of screw-in hooks 82. The addition of the hooks 82 will not noticeably affect the sound quality of the box call 80. The box call 80 is then placed on the rubber feet 70 in a manner similar to the slate 78 described above. The elastic band 54 is then stretched over the hooks 82, and secured to flange 42 in the same manner as was described in reference to the slate call 78.

It should be emphasized that the holder 10 can be used in any application where it is necessary to keep an item within easy reach while leaving the hands free. For example, the holder 10 can be used by aircraft pilots to hold their clipboards in view while leaving their hands free to operate the aircraft controls. Other user could find the invention useful in holding notepads, tools, or most any conceivable small item one wishes to keep at the ready in a hands-free mode.

It is to be understood that the present invention is not limited to the embodiments described above, but encompasses any and all embodiments within the scope of the following claims.

I claim:

1. A holder for holding a game call on a user's limb while leaving the user's hands free, said holder comprising:
    a base having a top face and a bottom face;
    a plurality of rubber feet projecting from said top face;
    a strap attached to said base, said strap having a buckle to thereby allow said holder to be securable to the limb of the user;
    an elastic band securable across said top face to thereby allow an item to be retained against said plurality of rubber feet;
    a safety strap having a first end and a second end said first end of said safety strap being attached to said base and said second end of said safety strap being securable by a hook-and-loop fastener operatively coupled to said base such that said safety strap is secured by said hook-and-loop fastener and extends across said top face of said base;
    a tether attached to said base; and
    a hook, said tether supporting said hook, said hook being securable to a belt or belt loop worn by the user to thereby prevent said holder from sliding down a thigh of the user when said holder is worn on the thigh of the user.

2. The holder according to claim 1, wherein said base is substantially rectangular in planform, said base has a central opening, and said plurality of rubber feet are symmetrically distributed about said central opening.

3. The holder according to claim 2, wherein said base has a first, second, third, and fourth side, and said base has a first slot proximate said second side and a second slot proximate said fourth side to thereby allow attachment of said strap.

4. The holder according to claim 3, wherein a first flange extends from said bottom face proximate said first side and a second flange extends from said bottom face proximate said third side to thereby cause said top face to be spaced apart from the user's limb when said holder is strapped to the user's limb.

5. The holder according to claim 4, wherein said first flange and said second flange have edges that are curved to follow the contour of the user's limb.

6. The holder according to claim 4, wherein said strap has a first piece and a second piece, said first piece having an end secured to said first slot and a first free end, said second piece having an end secured to said second slot and a second free end, said first piece adjustably supporting a first portion of said buckle, and a second portion of said buckle being attached to said second free end to thereby render said strap adjustable in size.

7. The holder according to claim 4, wherein said elastic band, is in the form of a closed loop having first, second, third, and, fourth portions, said first portion of said elastic band being attached to said second flange, and said second and third portions of said elastic band stretching across said top face under tension when said fourth portion of said elastic band is looped around a projection formed in said first flange.

8. The holder according to claim 7, wherein said first flange and said second flange have edges that are curved to follow the contour of the user's limb.

9. The holder according to claim 7, wherein said strap has a first piece and a second piece, said first piece having an end secured to said first slot and a first free end, said second piece having an end secured to said second slot and a second free end, said first piece adjustably supporting a first portion of said buckle, and a second portion of said buckle being attached to said second free end to thereby render said strap adjustable in size.

10. A holder for holding an item on a user's limb while leaving the user's hands free, said holder comprising:

a base having a top face and a bottom face;

a plurality of resilient support means projecting upwardly from said top face;

a strap attached to said base, said strap having a buckle to thereby allow said holder to be securable to the limb of the user;

a retaining means securable over said top face to thereby allow an item to be retained against said plurality of resilient support means, a safety strap having a first end and a second end, said first end of said safety strap being attached to said base and said second end of said safety strap being securable by a hook-and-loop fastener such that said safety strap is stretched across said top face when said second end of said safety strap is secured by said hook-and-loop fastener;

a tether having first and second ends, said first end being attached to said base; and a belt hook means attached to said second tether end, and securable to a belt worn by the user to thereby prevent said holder from sliding down a thigh of the user when said holder is worn on the thigh of the user.

11. The holder according to claim 10, wherein said base is substantially rectangular in planform, said base has a central opening, and said plurality of resilient support means are symmetrically distributed about said central opening.

12. The holder according to claim 10, further comprising in combination a game call seated on said plurality of resilient support means.

* * * * *